United States Patent Office 3,661,957
Patented May 9, 1972

3,661,957
PREPARATION OF CARBOXYLIC ACIDS
Ronald L. Shubkin, Oak Park, Mich., assignor to Ethyl Corporation, New York, N.Y.
No Drawing. Filed Dec. 8, 1969, Ser. No. 883,309
Int. Cl. C08h 17/36
U.S. Cl. 260—413                    13 Claims

ABSTRACT OF THE DISCLOSURE

A process for preparing carboxylic acids from $C_{10+}$ olefins, CO and $H_2O$ using a cobalt catalyst and a ketone or ether solvent; and the use of pyridine as a promoter in this process, are disclosed.

BACKGROUND OF THE INVENTION

This invention is directed to the process for preparing carboxylic acids from olefins, CO and $H_2O$ using a cobalt catalyst; this process will also be referred to herein as a carboxylation process.

The reaction of olefins, CO and $H_2O$ using a cobalt catalyst is known. Carrying out this reaction with low molecular weight olefins (up to $C_8$) in relatively large amounts of certain solvents which include ketones, is also known (U.S. 2,911,422). When higher molecular weight olefins, e.g., dodecene are used in the system of U.S. 2,911,422, the reaction rate is very low. For example, according to U.S. 2,911,422 an octene ($C_8$) reactant yields 82% to 90% carboxylic acid in 2½ hours at high solvent concentrations and at a reaction temperature of 165° C.; under substantially the same reaction conditions, 8 hours are required to achieve the same yield of carboxylic acids using dodecene ($C_{12}$).

Quite unexpectedly, it has been discovered that by reducing the amount of solvent, the reaction rate for these higher olefins is significantly increased; and the isomerization of α-olefins to internal olefins is also dramatically reduced. Small amounts of pyridines have also been found to promote the yield of linear acid in the product.

SUMMARY OF THE INVENTION

A process for preparing carboxylic acids by reacting a $C_{10+}$ olefin, $H_2O$ and CO using a cobalt catalyst in the presence of a ketone or ether solvent, the amount of solvent ranging from about 30% to about 50% by weight of the minimum amount of solvent which is required to form a solution at room temperature of the olefin and water reactants; the above process carried out in the presence of a linearity promoting quantity of a pyridine.

DESCRIPTION OF THE PREFERRED EMBODIMENTS

A preferred embodiment of the invention is a process for preparing carboxylic acid which comprises reacting an olefin or a mixture of olefins having about 10 or more carbon atoms with $H_2O$ and CO wherein the molar ratio of olefin:$H_2O$ is at least 1:1, using a cobalt catalyst, in the presence of a solvent selected from the class consisting of alkyl ketones having up to 11 carbon atoms and alkyl ethers having from 4 to about 16 carbon atoms, the amount of solvent used ranging from about 30% to about 50% by weight of the amount of solvent which is required to form a solution at room temperature of the olefin and water reactants, said process being carried out at temperatures ranging from about 125° C. to 175° C. and at pressures of at least 1,000 p.s.i. A most preferred amount of solvent is about 40% of the amount as defined above. The ketones are more preferred solvents. Acetone is most preferred.

Another preferred embodiment of this invention is the process described above carried out in the presence of a promoter quantity of a pyridine type amine. As will be discussed in more detail below, this amine promotes the production of linear acid product. Pyridine is a most preferred promoter.

Olefins having about 10 or more carbon atoms are useful in the present invention; the designation $C_{10+}$ is used herein to indicate such olefins. The term olefins means any organic compound having at least 1 non-aromatic, carbon-to-carbon double bond. It includes compounds having one (monoolefin) or more (polyolefin) of such carbon-to-carbon double bonds. Cyclic compounds as well as acyclic olefins, branched as well as linear olefins are included. Useful olefins may also contain other functional groups such as halide, carboxy, carbonyl, hydroxy, and the like, provided that these functional groups do not adversely effect the process of the present invention. Examples of useful olefins are 6-phenylhexene-1, oleic acid, cyclododecatriene, 4-chloropentadecene-1, 2-ethyldodecene-1, undecene-3, triacontene, tetracontene, 1,18-nonadecadiene, 1,3-tetracosadiene, ricinoleic acid, triisobutylene, 5-hydroxydodecene-1 and the like. Preferred olefins are aliphatic hydrocarbons of either the internal or terminal (alpha) type. Examples of such preferred olefins are dodecene-2, eicosene-3, octadecene-5, 3,5,7,9-pentamethyldodecene-1, 2-butyloctene-1, cyclododecene, octacosene-2, triacontatriene-2, 5,7-heptadecadiene-1,16 and the like. Acyclic α-hydrocarbon monoolefins are more preferred. Examples of these olefins are tetracontene-1, dodecene-1, decene-1, 2-hexyloctene-1, 7,9-dimethyldodecene-1, 3-butyloctene-1, hextriacontene-1, docosene-1, heptacosene-1, tridecene-1, pentadecene-1, and the like. Mixtures of olefins are also useful in the present invention.

Commercial mixtures of olefins can also be used in the present process. These commercial olefin mixtures are generally a mixture of various homologous olefins such as $C_{10}$, $C_{12}$, $C_{14}$ olefins; $C_{10}$, $C_{11}$ olefins; $C_{10}$, $C_{11}$, $C_{12}$ olefins; $C_{12}$, $C_{14}$, $C_{16}$ olefins; $C_{12}$, $C_{14}$ olefins; $C_{13}$, $C_{15}$, $C_{17}$ olefins; $C_{12}$, $C_{13}$, $C_{14}$, $C_{15}$, $C_{16}$ olefins; $C_{22}$, $C_{24}$, $C_{26}$ olefins; $C_{30}$, $C_{32}$, $C_{34}$, $C_{36}$ olefins; $C_{40}$ and higher olefin mixtures and the like. These commercial mixtures are synthesized for example by Ziegler catalyst polymerization of low molecular weight olefins such as ethylene or propylene; by dehydrogenation of suitable paraffins and the like. These commercial olefin mixtures can contain branched as well as straight-chain olefins. The mixed olefins thus obtained might also contain minor amounts of $C_6$–$C_8$ olefins, non-homologous olefins as well as non-olefin components. Such non-olefin components might be paraffins, alkyl halides, alcohols and the like; the nature of the non-olefin components is to a great degree dependent on the synthesis route utilized. The mixed olefins obtained from such a commercial synthesis need not be separated into the individual components to be useful. Mixtures containing $C_{10}$ to $C_{32}$ olefins wherein the α-moiety predominates are useful; such mixtures in the $C_{10}$–$C_{14}$ olefin range are particularly useful. By predominates I mean that more than 50% by weight of the olefins are alpha.

The solvents which are used in the present carboxylation process are generally liquid organic compounds of the ketone or ether class. Typical solvents are the alkyl ketones having up to about 11 carbon atoms such as diisobutyl ketone, cyclohexanone, methylethyl ketone, methylisobutyl ketone, diamyl ketone, cyclohexylethyl ketone and the like; and alkyl ethers having from 4 to about 16 carbon atoms such as diethyl ether, 1,4-dioxane, di-n-butyl ether, di-n-hexyl ether, diisopropyl ether, N-alkylmorpholines, di-2-ethylhexyl ether, $C_1$–$C_4$ dialkylglycol ethers and polyethers such as 1,2-diethoxy ethane, bis[2(2-methoxyethoxy)ethyl]ether, 1,2-diisopropoxy propane, 1,2-dimethoxy ethane and the like. Mixtures of these solvents can also be used. The ketone solvents are more preferred, and acetone is especially preferred.

The amount of solvent used in the present process is a controlling characteristic of the invention. In order to effect the unexpected improvement in the rate of carboxylation of $C_{10}$ and higher olefins, the amount of solvent used is in the range of between 20% and 60% and preferably between about 30% to about 50% by weight of the amount of solvent which is required to form a solution, at room temperature, of the olefin and water reactants. In other words, if 100 parts by weight of a ketone or ether is the minimum quantity required at room temperature to form a solution of a $C_{10+}$ olefin and water, the present process requires the use of more than 20 and less than 60 parts, and preferably about 30 to about 50 parts, by weight of the solvent. A concentration of about 40% by weight (as defined above) of the solvent is most preferred. The data presented below will illustrate the unexpected effectiveness of this narrow solvent range on the rate of reaction. The unexpected effectiveness of this narrow solvent range on the isomerization of α-olefin starting material will also be illustrated.

The catalysts which are used in the present process are cobalt containing systems. The effective catalyst is thought to be a hydrido carbonyl complex; and thus any cobalt containing compound, cobalt metal and the like which can yield such a complex under the reaction conditions can be used in the present process. Cobalt salts, e.g. cobalt hexanoate, cobalt chloride, cobalt chelates, or cobalt complexes can be used. Dicobalt octacarbonyl is quite conveniently used. The amount of catalyst which can be employed is generally from about 0.001 to about 0.2 mole of cobalt metal per mole of olefin reactant.

Water is also a reactant in the present process. The amount of water used can be varied. Ordinarily, at least one mole of water per double bond in the olefin component is provided. Using a monoolefin for illustration purposes, the molar ratio of olefin:water can range from 1:1 to 1:6 or higher. Olefin:water molar ratios ranging from 1:2 to about 1:6 are preferred. An olefin:water molar ratio of 1:3 is conveniently used.

The process is ordinarily carried out under pressure. This pressure is primarily due to the carbon monoxide (CO) reactant. Thus, pressures ranging from about 750 to about 10,000 pounds per square inch (p.s.i.) can be used. Reaction pressures of 1,000 p.s.i. to about 3,500 p.s.i. are preferred.

The process of the present invention is generally carried out at elevated temperatures. Temperatures over about 100° C. are generally used. A preferred reaction temperature range is from about 125° C. to about 175° C. A most preferred reaction temperature is about 150° C.

The product obtained in the present carboxylation process is a mixture of acid isomers comprising linear acid as well as branched acid. This can be illustrated by the following reaction equation:

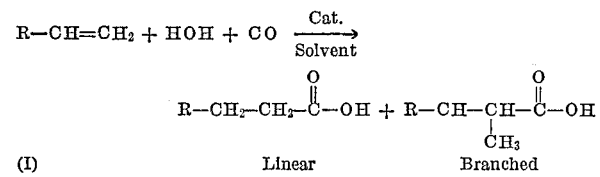

(I)  Linear  Branched

When using a linear α-olefin as one of the reactants under the conditions as heretofore described, the concentration of linear acid in the product ranges around 50%. The addition of small amounts of a pyridine to the above described process markedly increases the percentage of linear acid obtained. This linearity promoting effect of a pyridine is another embodiment of the present invention.

The pyridines which may be used as promoters in the present process include pyridine itself as well as substituted pyridines such as alkyl pyridines (for example, beta picoline, the lutidines, 2-methyl-5-ethylpyridine), α-bromopyridine, 4-chloropyridine, 3-nitropyridine, and the like. Pyridine is a most preferred promoter.

The concentration of pyridine is conveniently based on the amount of cobalt present as the cobalt catalyst. Expressed in terms of molar ratio of pyridine:cobalt (in cobalt catalyst), useful promoter ratios are 4:1 to 10:1, with a 5:1 ratio being most preferred. Ratios of pyridine:cobalt higher than this tend to reduce the acid yield while ratios below about 4:1 do not significantly improve the linearity of the acid product.

The following series examples will serve to illustrate the present invention. All percentages are by weight unless otherwise indicated. The reactants and the solvents were deaerated before use.

EXAMPLE 1

This example illustrates the carboxylation process when the amount of acetone required to form a solution of dodecene and water at room temperature is used.

A suitable autoclave was charged with 125 mmoles (millimoles) of dodecene-1, 375 mmoles of water, about 100 grams of acetone and 4.4 mmoles of cobalt carbonyl $[Co_2(CO)_8]$. These reactants were reacted under a stream of nitrogen. The autoclave was then sealed and flushed twice with carbon monoxide. The autoclave was then charged with carbon monoxide. The mixture was then heated to 150° C. with stirring, the pressure rising to 1,500 p.s.i.; the reaction was continued at this temperature for 3 hours. The autoclave was cooled to room temperature and it was vented.

The conversion of dodecene-1 was 100%. The yield of tridecanoic acids in the product was 53.8%, 63.8% of which was linear acid. The product also contained 41.9% internal olefin. The analysis of the product was made by gas liquid chromatography (glc).

EXAMPLE 2

This example illustrates the carboxylation process when about 60% of the amount of acetone used in Example 1 is utilized.

An autoclave was charged with 125 mmoles dodecene-1, 375 mmoles of water, about 60 grams of acetone and 4.4 mmoles of cobalt carbonyl. These reactants were added under a stream of nitrogen. The autoclave was then sealed and flushed with carbon monoxide. Carbon monoxide was charged to the autoclave and the mixture was then heated with stirring to 160° C., the pressure rising to 1,750 p.s.i.; the reaction was continued at this temperature for 2 hours. The autoclave was then cooled to room temperature and it was vented.

The conversion of dodecene-1 was 100%. The yield of tridecanoic acid was 62.2%. Of this acid yield 61.2% was a linear acid; the product also contained 31% internal olefin. The analysis of the product was made by glc.

EXAMPLE 3

This example illustrates the carboxylation process when the amount of acetone used is only 20% of the amount used in Example 1.

An autoclave was charged with 125 mmoles of dodecene-1, 375 mmoles of water, about 20 grams of acetone and 4.4 mmoles of cobalt carbonyl. The reactants were added under a stream of nitrogen. The autoclave was then sealed and flushed with carbon monoxide. Carbon monoxide was charged to the autoclave. The mixture was then heated to 150° C. with stirring with the pressure rising to 1,750 p.s.i.; the reaction was continued at this temperature for 3 hours. The autoclave was then cooled to room temperature and it was vented.

The conversion of dodecene-1 was 100%. Analysis of the product showed it to contain 21.4% tridecanoic acid; 68.2% of the acid was the linear acid. The product also contained 73.3% internal olefin. Analysis was made by glc.

The following examples illustrate the process of the present invention in which the amount of acetone solvent used is 40% of the amount used in Example 1.

EXAMPLE 4

An autoclave was charged with 125 mmoles dodecene-1, 375 mmoles of water, about 40 grams of acetone and 4.4 mmoles of cobalt carbonyl. These reactants and catalyst were added under a stream of nitrogen. The autoclave was then sealed and flushed with carbon monoxide. Carbon monoxide was then charged to the autoclave and the mixture was heated to 150° C. with stirring, the pressure rising to 1,500 p.s.i.; the reaction was continued at this temperature for 3 hours. The autoclave was then cooled to room temperature and it was vented.

The conversion of dodecene-1 was 100%. The yield of tridecanoic acid in the product was 87%. These tridecanoic acids were 61.7% linear. The products also contained 9% internal olefin. Analysis of the product was made by glc.

Good results are also obtained at pressures of 1,000 p.s.i. and 3,500 p.s.i.

EXAMPLE 5

An autoclave was charged with 125 mmoles of dodecene-1, 375 mmoles of water, about 40 grams of acetone and 8.8 mmoles of cobalt carbonyl. These reactants and catalyst were added under a stream of nitrogen. The autoclave was then sealed and flushed with carbon monoxide. Carbon monoxide was then charged to the autoclave. The mixture was then heated to 160° C. with stirring, the pressure rising to 1,750 p.s.i.; the reaction was continued at this temperature for 2 hours. The autoclave was then cooled to room temperature and it was vented.

The conversion of dodecene-1 was 100%. The yield of tridecanoic acids was 83.7%, of which 52.5% was linear acid. The product also contained 8.4% internal olefin. Analysis of the product was made by glc.

1,2-dimethoxy ethane used in an equivalent amount in place of acetone in Example 5 yields comparable results.

EXAMPLE 6

An autoclave was charged with 125 mmoles of dodecene-1, 375 mmoles of water, about 40 grams of acetone and 4.4 mmoles of cobalt carbonyl. These reactants and catalyst were added under a stream of nitrogen. The autoclave was then sealed and flushed with carbon monoxide. Carbon monoxide was then charged to the autoclave and the mixture was heated to 150° C. with stirring, the pressure rising to 1,500 p.s.i. The reaction was continued at this temperautre for 3 hours. The autoclave was then cooled to room temperature and it was vented.

The conversion of dodecene-1 was 100%. The yield of tridecanoic acid was 85.7%. The linearity of the acid product was 52.6%. The product also contained 11.7% internal olefin. Analysis of the product was made by glc.

Similar results are obtained when about 30 grams of acetone are used in Example 6.

EXAMPLE 7

An autoclave was charged with 125 mmoles of dodecene-1, 375 mmoles of water, about 40 grams of acetone and 4.4 mmoles of cobalt carbonyl. These reactants and catalyst were added under a stream of nitrogen. The autoclave was then sealed and flushed with carbon monoxide. Carbon monoxide was then charged to the autoclave and the mixture was heated to 150° C. with stirring, the pressure rising to 1,500 p.s.i. The reaction was continued at this temperature for 3 hours. The autoclave was then cooled to room temperature and it was vented.

The conversion of dodecene-1 was 100%. The yield of tridecanoic acid was 90.8%. The acid linearity was 42.9%; and the product also contained 10.5% internal olefin. The analysis of the product was made by glc.

Similar results are obtained when about 50 grams of acetone are used in Example 7.

Comparable yields of $C_{11}$ acids or $C_{18}$ acids are obtained when decene-1 or heptadecene-1, respectively, are used in place of dodecene-1 in Example 7. Cobalt acetate or cobalt acetylacetonate are also effective as catalysts in Example 7.

EXAMPLE 8

An autoclave was charged with 125 mmoles dodecene-1, 375 mmoles of water, about 40 grams of acetone and 4.4 mmoles of cobalt carbonyl. These reactants and catalyst were added under a stream of nitrogen. The autoclave was then sealed and flushed with carbon monoxide. Carbon monoxide was then charged to the autoclave and the mixture was heated to 150° C. with stirring, the pressure rising to 1,500 p.s.i. The reaction was continued at this temperautre for 3 hours. The autoclave was then cooled to room temperature and it was vented.

The conversion of dodecene-1 was 100%. The yield of tridecanoic acid was 91.4%. The acid linearity was 47.3%. The product contained 5.4% internal olefin. The analysis of the product was made by glc.

In Examples 1–8 the reactant ratios, the catalyst, and the reaction conditions were substantially the same. The only difference in each example was the amount of acetone used as the solvent. By comparing the results obtained in Examples 1, 2, and 3 with Examples 4, 5, 6, 7, and 8, it is quite apparent that when between 30% and 50% of the minimum amount of acetone required to form a solution of the reactants at room temperature is used, a significant improvement in acid yield and a significant reduction in internal olefin in the product, is obtained. Following is a table setting out the acetone concentrations, the acid yield and internal olefin in the product for Examples 1–8.

TABLE 1.—EFFECT OF SOLVENT QUANTITY

| Example | Acetone | | Reaction time (hours) | Percent | |
|---|---|---|---|---|---|
| | Grams | Required for solution [1] | | Acid yield | Internal olefins |
| 1 | 100 | 100 | 3 | 53.8 | 41.9 |
| 2 | 60 | 60 | 2 | 62.2 | 31.0 |
| 3 | 20 | 20 | 3 | 21.4 | 73.3 |
| 4 | 40 | 40 | 3 | 87.0 | 9.0 |
| 5 | 40 | 40 | 2 | 83.7 | 8.4 |
| 6 | 40 | 40 | 3 | 85.7 | 11.7 |
| 7 | 40 | 40 | 3 | 90.8 | 10.5 |
| 8 | 40 | 40 | 3 | 91.4 | 5.4 |

[1] Percent of the minimum amount of acetone required to form a solutiothe dodecene-1 and water reactants at room temperature.

The data in the table clearly shows that acid yield of over 83% is obtained when between 30% and 50% of the minimum amount of acetone required at room temperature to make a solution of the dodecene-1 and water reactants is used in the carboxylation reaction (Examples 4–8). Furthermore, the data shows that the amount of internal olefin found in the product is substantially reduced.

The present carboxylation system is also effective with internal olefins. The following example illustrates this effectiveness.

EXAMPLE 9

An autoclave is charged with 125 mmoles of random dodecene (this random dodecene contains about 90% internal dodecenes), 375 mmoles of water, about 40 grams of acetone and 4.4 mmoles of cobalt carbonyl. The autoclave is then sealed and flushed with carbon monoxide. The carbon monoxide is charged to the autoclave to a pressure of about 1,500 p.s.i. The mixture is then heated to 150° C. with stirring, and the reaction is continued at this temperature for 3 hours. The mixture is then cooled to room temperature and the autoclave is vented.

The product recovered is a mixture of tridecanoic acids with yield and linearity slightly lower than that obtained for a comparable run made with dodecene-1.

Good results are also obtained when the reactions of Examples 4-9 are carried out at temperatures of 125° C., 175° C., or 160° C. Other olefins disclosed such as pentadecene-1, octadecene-3, a commercial mixture $C_{10}$-$C_{32}$ olefin, eicosene-1, cyclododecene, oleic acid and the like, give comparable yields of carboxylic acids of one carbon atom more than the starting olefin when used in place of dodecene in the above examples. Methylethyl ketone, diamyl ketone, 1,2-diethoxy ethane, and bis[2(2-methoxyethoxy)ethyl]ether are equally effective in the above examples when used in place of acetone in equivalent quantities. The processes of Examples 4-9 can also be carried out at CO pressures (measured at the reaction temperature) of 1,000 p.s.i., 3,500 p.s.i., or higher. Although the olefin to water ratios in the above examples are 1:3, good results are also obtained when olefin:water molar ratios of 1:1 and 1:6 are used.

The following examples serve to illustrate another embodiment of the present invention, namely, the linearity promoting effect of small amounts of a pyridine. All parts are by weight unless otherwise noted. Olefin, water and solvent components were deaerated before use.

EXAMPLE 10

This example is the control run in which no pyridine promoter was used.

An autoclave was charged with 125 mmoles of dodecene-1, 375 mmoles of water, about 40 grams of acetone and 4.4 mmoles of cobalt carbonyl. The autoclave was flushed twice with carbon monoxide. Carbon monoxide was then charged to the autoclave. The mixture was then heated to 150° C. with stirring, the pressure rising to 1,750 p.s.i. and the reaction was continued at this temperature for 3.5 hours. The autoclave was cooled to room temperature and then vented.

The yield of tridecanoic acids obtained was 87.3% of which 54.7% was linear acid. The product also contained 8% internal olefins. The analysis of the product was made by glc.

EXAMPLE 11

The process of Example 10 was repeated except that the reaction time was 3 hours and about 4 grams of pyridine was also added in the reaction mixture. This amount of pyridine gives a pyridine:cobalt molar ratio of about 5:1.

The yield of tridecanoic acids obtained was 88%, of which 68.5% was linear acid. The product also contained 4.8% internal olefins. The analysis of the product was made by glc.

Similar results are obtained when pyridine is used at a pyridine:cobalt ratio of 4:1.

EXAMPLE 12

The process of Example 11 was repeated except that the reaction time was 4 hours.

The yield of tridecanoic acids was 82.3%, of which 71.5% was linear acid. The product also contained 4.6% internal olefins. Analysis was made by glc.

Similar results are obtained with 2-chloropyrdine, 3-nitropyridine, a lutidine, or α-picoline is used in place of pyridine in Example 12.

EXAMPLE 13

The process of Example 10 was repeated except that the amount of acetone used was about 34 grams and 7.5 grams of pyridine were also added. This amount of pyridine gives a pyridine:cobalt ratio of about 10:1.

The yield of tridecanoic acids obtained was 59.3%, with 79% being linear acid. The product also contained internal olefins.

Data from Examples 10-13 is tabulated in Table 2.

TABLE 2.—PROMOTER EFFECT OF PYRIDINE

| Example | Pyridine, grams | Pyridine: cobalt (molar ratio) | Percent Acid linearity | Linearity increase |
|---|---|---|---|---|
| 10 | None | | 54.7 | |
| 11 | 4 | 5:1 | 68.5 | +13.8 |
| 12 | 4 | 5:1 | 71.5 | +16.8 |
| 13 | 7.5 | 10:1 | 79 | +24.3 |

Comparing the linearity of product obtained in Examples 11-13 (pyridine promoted) with that obtained in Example 10 (no pyridine) the promoter effect of small amounts of pyridine is readily apparent. Pyridine:cobalt ratios of 5:1 to 10:1 increase the product acid linearity by up to 24%.

Other pyridines such as bromopyridine, chloropyridine, α-picoline are equally effective as promoter in amounts sufficient to give a pyridine:cobalt molar ratio of from about 4:1 to about 10:1. Improved linearity of carboxylic acids obtained from $C_{10}$-$C_{32}$ mixed commercial olefins, triacontene-1, decene-1, tetradecene-1, undecene-1, heptadecene-2, $C_{40}$ olefin cyclododecene tetracosene-4, 2-butyldecene-1 and the like is also effected by the use of pyridine promoters.

The following example illustrates the process of the present invention utilizing a mixture of olefins as a reactant. All percentages are by weight.

EXAMPLE 14

An autoclave was charged with 38 parts of a $C_{10}$ monoolefin (98% α), 94 parts of a $C_{12}$ monoolefin (over 90% α), 68 parts of a $C_{14}$ olefin (over 85% α), 63.5 parts of $H_2O$, 31.6 parts of pyridine and 400 parts of acetone. This mixture was flushed with carbon monoxide and then 15 parts of $Co_2(CO)_8$ were added. The autoclave was then sealed, pressured with carbon monoxide and heated to 150° C. with stirring. The pressure at this temperature was 1,800 p.s.i. The reaction was continued at this temperature with stirring for 3.5 hours. The autoclave was then cooled and vented.

Total yield of carboxylic acid product was 94.0%, of which 18.9% was $C_{11}$ acids, 43.0% was $C_{13}$ acids and 32.1% was $C_{15}$ acids. The linearity of these acids determined by glc was as follows: $C_{11}$ acids—73.6% linear; $C_{13}$ acids—71.6% linear; $C_{15}$ acids—67.6% linear.

Cobalt on a carrier or other cobalt compounds such as cobalt propionate, cobalt acetylacetonate, cobalt nitrate, or cobalt complexes are also effective in the above examples.

The process of the present invention produces a mixture of acids. These acid mixtures may be used as such or may be separated, by any suitable procedure, before use.

The acid products of the present invention have many uses, e.g. as chemical intermediates in soap manufacture.

The process of the present invention has been fully disclosed above. It encompasses two embodiments, one being a carboxylation process for $C_{10}$ and higher olefins characterized by narrow concentration range of solvent and the second being the improved carboxylation process featuring the use of a product linearity promoter. Having fully described the present invention, the claims to it follow.

What is claimed is:

1. A process for preparing carboxylic acids by reacting monoolefin having about 10 or more carbon atoms with water and carbon monoxide using a cobalt catalyst in the presence of a solvent selected from the class consisting of alkyl ketones having up to about 11 carbon atoms and alkyl ethers having from 4 to about 16 carbon atoms, the amount of said solvent used being from about 30% to about 50% by weight of the amount of solvent which is required to form a solution of said olefin and water reactants at room temperature, said process being carried out at temperatures ranging from 125° C. to 175° C. and at pressures ranging from 1,000 p.s.i. to 3,500 p.s.i.

2. The process of claim 1 wherein said olefin is a mixture of hydrocarbon predominantly α-monoolefins ranging from about $C_{10}$ to about $C_{14}$.

3. The process of claim 1 wherein the amount of said solvent is about 40% by weight of the amount required to form said solution.

4. The process of claim 1 wherein the water:olefin molar ratio is about 3:1.

5. The process of claim 1 wherein said reaction temperature is about 150° C.

6. The process of claim 1 wherein said solvent is a ketone.

7. The process of claim 6 wherein said ketone is acetone.

8. The process of claim 7 wherein the water:olefin ratio is about 3:1, the reaction temperature is about 150° C., said olefin is dodecene, said catalyst is cobalt carbonyl, and the reaction time is about 3 hours.

9. The process of claim 1 carried out in the presence of a linearity promoting quantity of a pyridine, the quantity of said pyridine being such that the molar ratio of pyridine:cobalt is from about 4:11 to about 10:1.

10. The process of claim 9 wherein said olefin is a mixture of hydrocarbon predominantly α-monoolefins in the range of from about $C_{10}$ to about $C_{14}$.

11. The process of claim 9 wherein said olefin is a hydrocarbon α-monoolefin and said solvent is a ketone.

12. The process of claim 11 wherein said ketone is acetone and said promoter is pyridine.

13. The process of claim 12 wherein said olefin is dodecene, said molar ratio of pyridine:cobalt is about 5:1, said water:olefin molar ratio is 3:1, said reaction temperature is about 150° C., said catalyst is cobalt carbonyl.

References Cited

UNITED STATES PATENTS

| 3,462,481 | 8/1969 | Rudkovsky et al. | 260—514 |
| 3,383,398 | 5/1968 | Peck et al. | 260—413 |
| 3,064,040 | 11/1962 | Klemchuk | 260—514 |

LEWIS GOTTS, Primary Examiner

E. G. LOVE, Assistant Examiner

U.S. Cl. X.R.

260—498, 514 C, 515 R, 537 R

PO-1050
(5/69)

UNITED STATES PATENT OFFICE
CERTIFICATE OF CORRECTION

Patent No. 3,661,957                     Dated    May 9, 1972

Inventor(s) Ronald L. Shubkin

It is certified that error appears in the above-identified patent and that said Letters Patent are hereby corrected as shown below:

Column 6, line 37, insert paragraph -- Comparable yields of $C_{11}$ acids or $C_{18}$ acids are obtained when decene-1 or heptadecene-1, respectively, are used in place of dodecene-1 in Example 7. --

Signed and sealed this 1st day of August 1972.

(SEAL)
Attest:

EDWARD M. FLETCHER, JR.        ROBERT GOTTSCHALK
Attesting Officer              Commissioner of Patents

UNITED STATES PATENT OFFICE
CERTIFICATE OF CORRECTION

Patent No. 3,661,957            Dated May 9, 1972

Inventor(s) Ronald L. Shubkin

It is certified that error appears in the above-identified patent and that said Letters Patent are hereby corrected as shown below:

Column 9, claim 9, line 22, "4:11" should read -- 4:1 --.

Signed and sealed this 28th day of November 1972.

(SEAL)
Attest:

EDWARD M. FLETCHER, JR.          ROBERT GOTTSCHALK
Attesting Officer                    Commissioner of Patents

PO-1050
(5/69)

UNITED STATES PATENT OFFICE
CERTIFICATE OF CORRECTION

Patent No. 3,661,957　　　　　Dated May 9, 1972

Inventor(s) Ronald L. Shubkin

It is certified that error appears in the above-identified patent and that said Letters Patent are hereby corrected as shown below:

Claim 1, line 4 (Column 9, line 22), "4.11" should be -- 4.1 --.

Signed and sealed this 27th day of March 1973.

(SEAL)
Attest:

EDWARD M.FLETCHER,JR.　　　　　ROBERT GOTTSCHALK
Attesting Officer　　　　　　　　Commissioner of Patents